(12) United States Patent  
Chan

(10) Patent No.: US 9,407,674 B2  
(45) Date of Patent: Aug. 2, 2016

(54) METHOD AND DEVICE FOR REMOVING OBJECTS FROM A VIDEO FEED IN REAL-TIME

(71) Applicant: Shui Yu Chan, Gaithersburg, MD (US)

(72) Inventor: Shui Yu Chan, Gaithersburg, MD (US)

(*) Notice: Subject to any disclaimer, the term of this patent is extended or adjusted under 35 U.S.C. 154(b) by 219 days.

(21) Appl. No.: 14/225,381

(22) Filed: Mar. 25, 2014

(65) Prior Publication Data

US 2015/0277706 A1    Oct. 1, 2015

(51) Int. Cl.
*G06F 3/00* (2006.01)
*H04L 29/06* (2006.01)
*G06F 3/0482* (2013.01)

(52) U.S. Cl.
CPC .............. *H04L 65/40* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 6,320,600 B1* | 11/2001 | Smith | ............ | G11B 27/031 348/722 |
| 2008/0126965 A1* | 5/2008 | Shimotashiro | ......... | H04N 7/163 715/764 |
| 2010/0309147 A1* | 12/2010 | Fleizach | ............ | G06F 3/04883 345/173 |
| 2011/0299547 A1* | 12/2011 | Diab | ............ | G06Q 20/10 370/401 |
| 2013/0004090 A1* | 1/2013 | Kundu | ............ | G07F 19/207 382/232 |
| 2014/0095504 A1* | 4/2014 | Soroushian | ......... | G06F 17/3002 707/737 |

* cited by examiner

*Primary Examiner* — Hua Lu
(74) *Attorney, Agent, or Firm* — Matthew M. DiMaggio, Esq.

(57) ABSTRACT

According to embodiments of the invention, systems, methods and devices are directed to removal of objects in a video feed that are captured continuously through video sources in real-time. Various embodiments of the invention implement several novel features, including, in one embodiment, a device that is coupled to cameras has an input device for selecting the objects to be removed from the feed. The selected object is removed and replaced with pixels neighboring the location where the pixels were taken from. Contour may also be controlled via the input, and sensitivity may be adjusted based on the application. Removed objects may also be selectively reintroduced into the video feed via the input device.

4 Claims, 5 Drawing Sheets ially, this invention relates to removing unwanted and/or
METHOD AND DEVICE FOR REMOVING OBJECTS FROM A VIDEO FEED IN REAL-TIME

FIELD OF THE INVENTION

This invention generally relates to multimedia. Specifically, this invention relates to removing unwanted and/or sensitive objects/images/people from a video feed in real-time.

BACKGROUND OF THE INVENTION

Video capturing and surveillance has segmented itself into many facets of everyday life. No matter where an individual goes or what an individual does, there is always a video being captured or generated. The most common reason for the multitude of cameras in public spaces is security. However, the growing number of cameras has led to an increase in privacy concerns.

Video editing is well known in the art. Video processing techniques are capable of processing of images so that some images look very differently than the original source. There is no question that video processing can be used in protecting certain information from being disclosed to the general public or to the wrong audience. For example, these techniques are used extensively in security checking in virtually every building where security is a concerned, such as hospitals, police stations, and airports. In most instances, some of these videos are captured continuously, 24 hours a day. The challenge is, there are hardly any technologies to remove certain parts of a video due to privacy concerns. For example, in a video captured in an airport, certain individuals may appear on camera who posed a security risk or may be at risk if their whereabouts are known to others. To protect those people in terms of privacy, there exists a need in the art to remove certain moving objects from a live video feed.

SUMMARY OF THE INVENTION

According to embodiments of the invention, systems, methods and devices are directed to removal of objects in a video feed that are captured continuously through video sources in real-time. Various embodiments of the invention implement several novel features, including, in one embodiment, a device that is coupled to cameras has an input device for selecting the objects to be removed from the feed. The selected object is removed and replaced with pixels neighboring the location where the pixels were taken from. Contour may also be controlled via the input, and sensitivity may be adjusted based on the application. Removed objects may also be selectively reintroduced into the video feed via the input device.

In an embodiment of the disclosed invention, a multimedia black box is used for protecting certain sensitive information from display by removing selective objects from video streams captured by cameras in real-time. The multimedia black box may have one or more of the following components: a) a first input element connected to a first device that has a display, a camera, a video and audio input interface and a video and audio output interface, the first device being a traditional image or video capturing device; b) a second input element connected to a second device that has a display, a camera, a video and audio input interface and a video and audio output interface, the second device being a traditional image or video capturing device; c) a first output element connected to the first device for outputting processed signals back to the first device; d) a second output element connected to the second device for outputting processed signals back to the second device; and e) a touch screen having a user interface operable to select objects on a video stream being captured by the first and second devices;

The user interface facilitates and/or carries out the following: a) video signals captured from both the first device and the second device are transmitted simultaneously to the black box via the first and second input elements; b) the video signals can be paused when the signals arrive at the touch screen of the black box such that contours of objects are definable by a user to be removed; c) the defined contour of objects and the video are further sent securely to a remote server via a network; d) the video signals of both the first and second devices are screened in real-time to detect and remove any instances of the defined contour of objects are removed from each of the video signals and missing areas vacated by the removed objects are filled using neighboring pixels; and e) the processed video signals are subsequently sent back to the respective devices by the black box through the first and second outputs, the processed videos signals appearing on the displays of the first and second devices.

In a further embodiment, sensitivity of the defined contour of objects may be configurable via a remote server, so that one object can be screened from the video signals when the detected object reaches a lower matching sensitivity level whereas another object stays in the video signals when the object fails to reach a defined matching sensitivity level. Further, other parameters of the black box may be configurable via a web page, the parameters including choices of processing means, locations of the remote server or the cloud, authentication information, security certificates, and various types of processing choices of the audio and video signals, further wherein a processing choice includes mixing the video and audio signals so that the processed video and audio signals appear to originate from a single source.

Still further, the processed video signals may be outputted to a pairing output, the pairing output being an output channel having video and audio signals that are synchronized simultaneously with a second device. The output element may be connected to both the first or second devices through a KVM switch.

In still a further embodiment, the user may undo the removal of one defined contour of object so that the one defined contour of object reappears but the rest of the defined contour of objects remain removed from the video signals. Further, a user may configure parameters of the black boxes through a web page by selecting black boxes. The parameters may include choices of processing means, locations of the remote server or the cloud, authentication information, security certificates, and various types of processing choices of the audio and video signals. The processing choice may include mixing the video and audio signals so that the processed video and audio signals appear to originate from only a single source. Furthermore, the first and second black boxes may be located in separate premises. The processed video and audio signals may be outputted to a pairing output, the pairing output being an output channel whose video and audio signals are synchronized simultaneously with a third device.

In accordance with these and other objects which will become apparent hereinafter, the invention will now be described with particular reference to the drawings.

DETAILED DESCRIPTION

According to embodiments of the invention, systems, methods and devices are directed to removal of objects in a video feed that are captured continuously through video sources in real-time. Various embodiments of the invention implement several novel features, including, in one embodiment, a device that is coupled to cameras has an input device for selecting the objects to be removed from the feed. The selected object is removed and replaced with pixels neighboring the location where the pixels were taken from. Contour may also be controlled via the input, and sensitivity may be adjusted based on the application. Removed objects may also be selectively reintroduced into the video feed via the input device.

Figure 1:
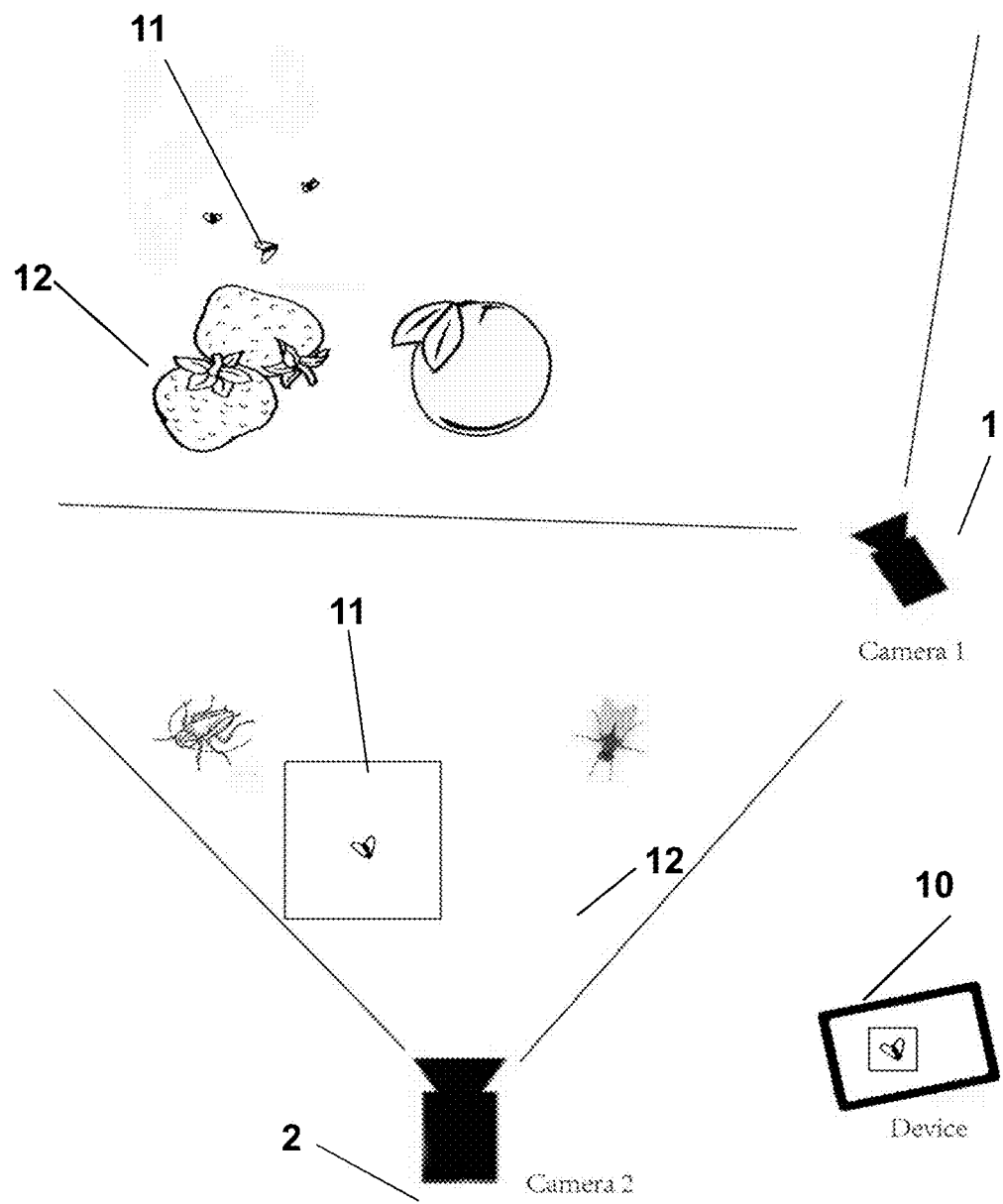
FIG. 1 is a top plan view of an exemplary configuration according to an embodiment of the disclosed technology.

Referring now to the figures, systems, methods and devices are provided for selectively removing objects from a real-time video feed using a black box device to pre-specify the contours of the object to be removed when detected in the feed. A "black box" may be any device having one or more video inputs and outputs, and is used to exemplary purposes. Thus, the term "black box" is not meant to be limiting in any manner. FIG. 1 is a top plan view of an exemplary configuration accord. A multimedia black box is provided for protecting certain sensitive information from display by removing selective objects 11 from video streams captured by cameras 1 and 2 in real-time. Such a device comprises a first input element connected to a first device that has a display, a camera 1, a video and audio input interface and a video and audio output interface, the first device being a traditional image or video capturing device. Further, a second input element is demonstrated. It is connected to a second device that has a display, a camera 2, a video and audio input interface and a video and audio output interface. As one understood by skilled in the art, the second device can be a traditional image or video capturing device.

Figure 2:
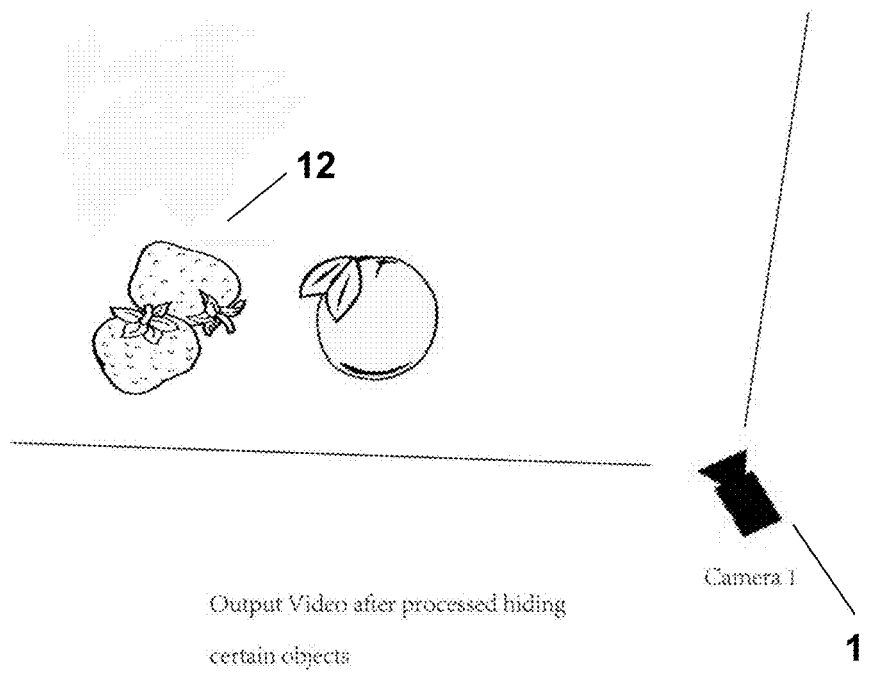
FIG. 2 shows the configuration of FIG. 1 with the selected object removed.
Figure 3:
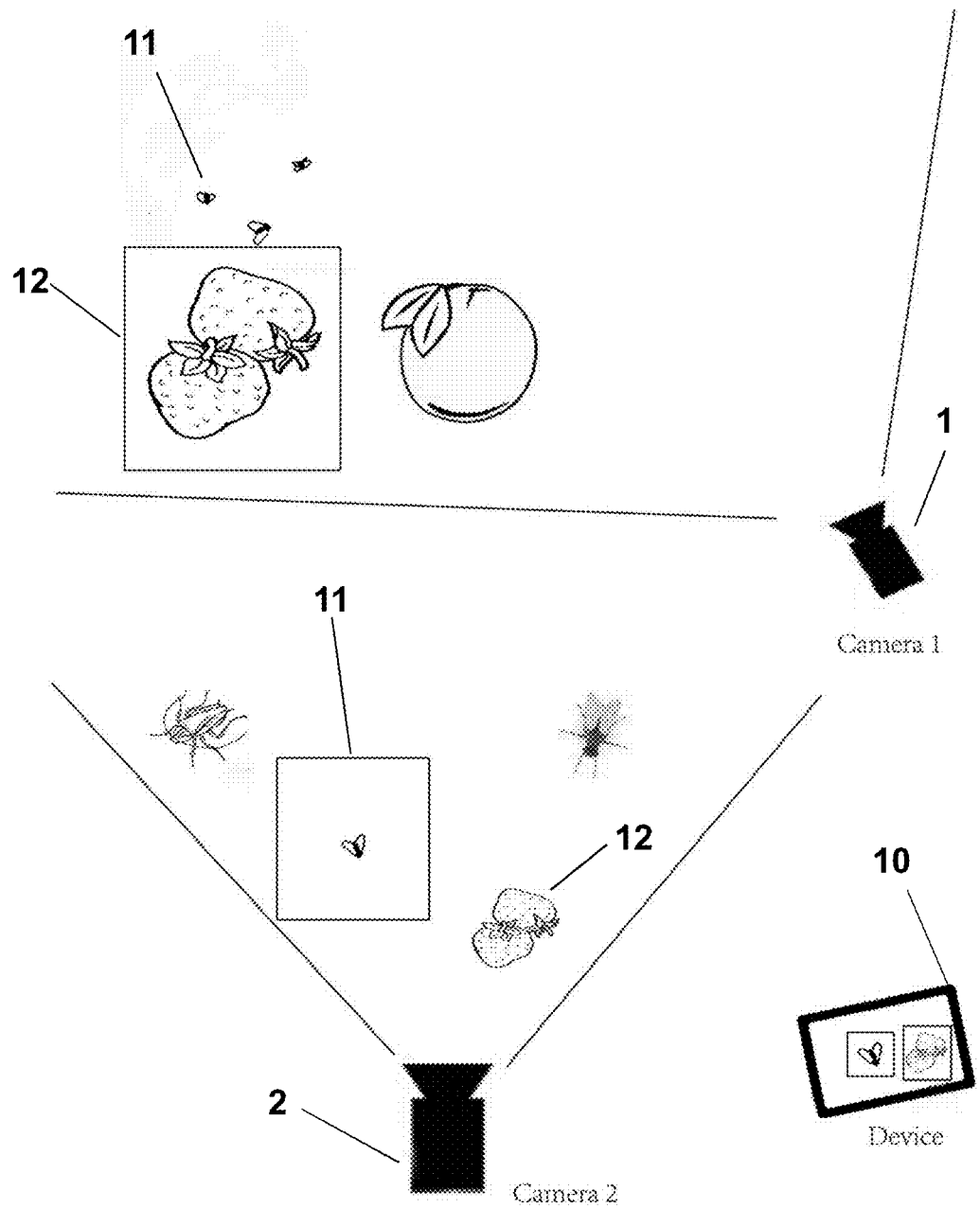
FIG. 3 is a top plan view of another exemplary configuration according to an embodiment of the disclosed technology.

Output elements are included in the black box. For example, a first output element can be connected to the first device 10 for outputting processed signals back to the first device, whereas a second output element is connected to the second device for outputting processed signals back to the second device. FIG. 3 is a top plan view of another exemplary configuration according to an embodiment of the disclosed technology. The exemplary black box device can further include a touch screen having a user interface operable to select objects on a video stream being captured by the first and second devices 10, wherein video signals are captured from both the first device and the second device are transmitted simultaneously to the black box via the first and second input elements. Functions can be performed on the video signals. For example, the video signals can be configured to be paused when the signals arrive at the touch screen of the black box such that contours of objects are definable by a user to be removed. The defined contour of objects and the video are further sent securely to a remote server via a network, so that the video signals of both the first and second devices 10 are screened in real-time to detect and remove any instances of the defined contour of objects 11 are removed from each of the video signals and missing areas vacated by the removed objects 11 are filled using neighboring pixels, as shown on FIG. 2, which shows the configuration of FIG. 1 with the selected object removed.

Figure 4:
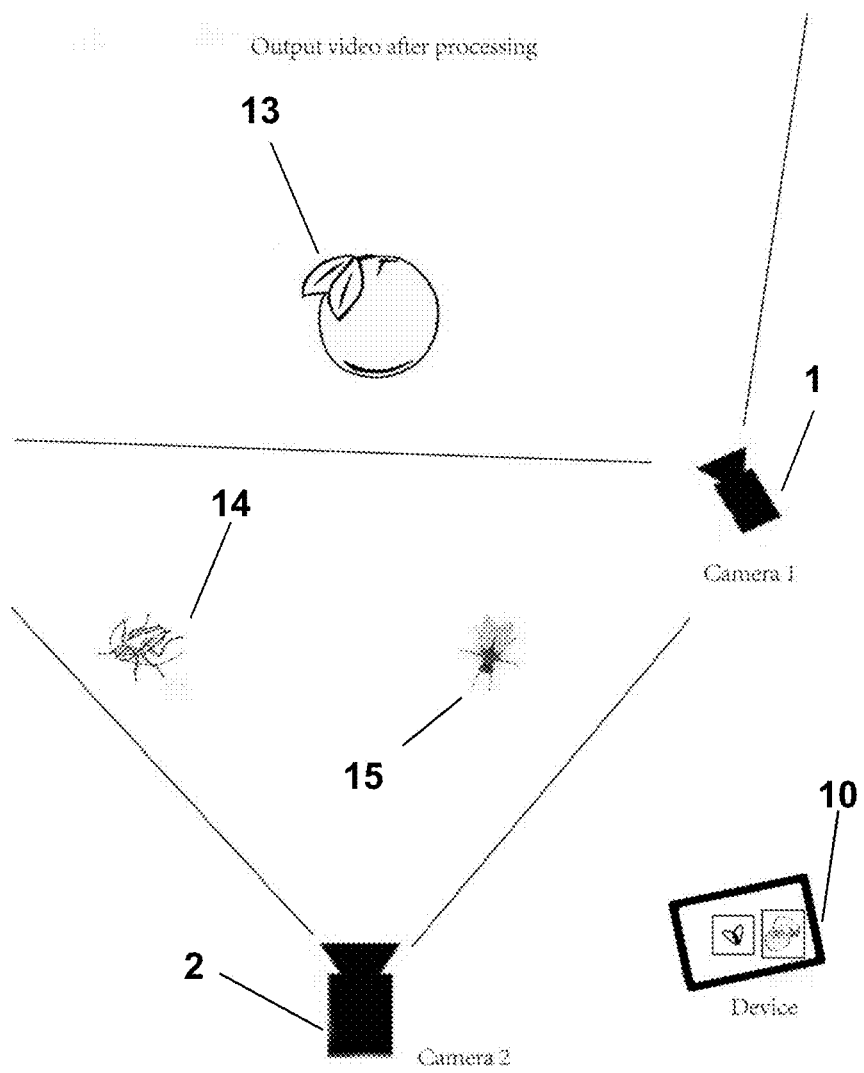
FIG. 4 shows the configuration of FIG. 3 with the selected object removed.

The processed video signals are subsequently sent back to the respective devices by the black box through the above-stated first and second outputs. These videos signals can appear on multiple displays of the first and second devices. FIG. 4 shows the configuration of FIG. 3 with the selected object removed. According to another embodiment consistent with the present invention, the sensitivity of the defined contour of objects is configurable via a remote server, so that one object can be screened from the video signals when the detected object 14 reaches a lower matching sensitivity level whereas another object 15 stays in the video signals when the object fails to reach a defined matching sensitivity level.

Further into the embodiment, other parameters of the black box are configurable via many user interfaces such as a web page. In one additional embodiment, such parameters may include choices of processing means, locations of the remote server or the cloud, authentication information, security certificates, and various types of processing choices of the audio and video signals, further wherein a processing choice includes mixing the video and audio signals so that the processed video and audio signals appear to originate from a single source. Subsequently, the processed video signals are outputted to a pairing output that can serve as an output channel having video and audio signals that are synchronized simultaneously with a second device. The embodiment can be implemented so that the output element can be connected to both the first or second devices through a KVM switch allowing some flexibility to the black box user.

Figure 5:
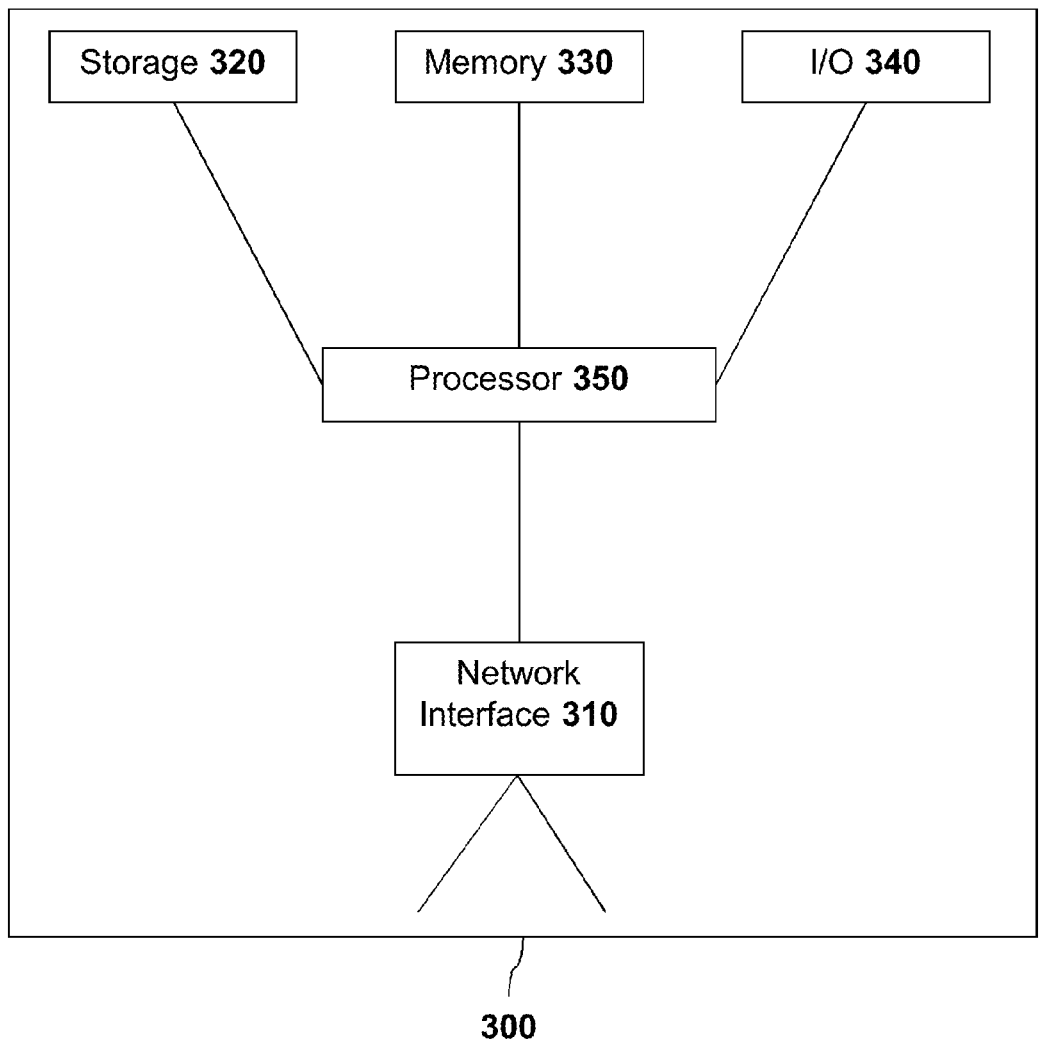
FIG. 5 is a high-level block diagram of a microprocessor device that may be used to carry out the disclosed technology.

FIG. 5 is a high-level block diagram of a microprocessor device that may be used to carry out the disclosed technology. The device 300 may or may not be a computing device. The device 300 comprises a processor 350 that controls the overall operation of a computer by executing the reader's program instructions which define such operation. The device's program instructions may be stored in a storage device 320 (e.g., magnetic disk, database) and loaded into memory 330 when execution of the console's program instructions is desired. Thus, the device's operation will be defined by its program instructions stored in memory 330 and/or storage 320, and the console will be controlled by the processor 350 executing the console's program instructions.

The device 300 may also include one or a plurality of input network interfaces for communicating with other devices via a network (e.g., the internet). The device 300 further includes an electrical input interface for receiving power and data from a power or RFID source. The device 300 may also include one or more output network interfaces 310 for communicating with other devices. The device 300 may also include input/output 340 representing devices which allow for user interaction with a computer (e.g., display, keyboard, mouse, speakers, buttons, etc.).

One skilled in the art will recognize that an implementation of an actual device will contain other components as well, and that FIG. 5 is a high level representation of some of the components of such a device for illustrative purposes. It should also be understood by one skilled in the art that the devices depicted and described with respect to FIGS. 1 through 4 may be implemented on a device such as is shown in FIG. 5.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described herein are also contemplated and within the scope of the invention.

What is claimed is:

1. A multimedia black box for protecting certain sensitive information from display by removing selective objects from video streams captured by cameras in real-time, comprising:
    a first input element connected to a first device that has a display, a camera, a video and audio input interface and a video and audio output interface, the first device being a traditional image or video capturing device;
    a second input element connected to a second device that has a display, a camera, a video and audio input interface and a video and audio output interface, the second device being a traditional image or video capturing device;
    a first output element connected to the first device for outputting processed signals back to the first device;
    a second output element connected to the second device for outputting processed signals back to the second device; and
    a touch screen having a user interface operable to select objects on a video stream being captured by the first and second devices, wherein:
        video signals captured from both the first device and the second device are transmitted simultaneously to the black box via the first and second input elements;
        the video signals are pausable when the signals arrive at the touch screen of the black box such that contours of objects are definable by a user to be removed;
        the defined contour of objects and the video are further sent securely to a remote server via a network;
        the video signals of both the first and second devices are screened in real-time to detect and remove any instances of the defined contours of objects such that the objects are removed from each of the video signals and missing areas vacated by the removed objects are filled using neighboring pixels; and
        the processed video signals are subsequently sent back to the respective devices by the black box through the first and second outputs, the processed videos signals appearing on the displays of the first and second devices.

2. The black box of claim 1, wherein:
    sensitivity of the defined contour of objects is configurable via a remote server, so that one object can be screened from the video signals when the detected object reaches a lower matching sensitivity level whereas another object stays in the video signals when the object fails to reach a defined matching sensitivity level;
    other parameters of the black box are configurable via a web page, the parameters including choices of processing means, locations of the remote server or the cloud, authentication information, security certificates, and various types of processing choices of the audio and video signals, further wherein a processing choice includes mixing the video and audio signals so that the processed video and audio signals appear to originate from a single source;
    the processed video signals are outputted to a pairing output, the pairing output being an output channel having video and audio signals that are synchronized simultaneously with a second device; and
    the output element is connected to both the first or second devices through a kernel-based virtual machine switch.

3. A multimedia black box for protecting certain sensitive information from display by removing selective objects from video streams captured by cameras in real-time, comprising:
    a first input element, being connected to a first device that has a display, a camera, a video and audio input interface and a video and audio output interface;
    a second input element, being connected to a second device that has a display, a camera, a video and audio input interface and a video and audio output interface;
    a first output element, being connected to the first device for outputting processed signals back to the first device;
    a second output element, being connected to the second device for outputting processed signals back to the second device; and
    a touch screen as an user interface allowing a user to control the certain sensitive information from displaying in the first and second devices, wherein:
        video signals of both the first and second devices are transmitted simultaneously to the black box via the first and second input elements through interfaces, including high-definition multimedia interface, to be transmitted from the device to the black box;
        the user is allowed to freeze the video signals of both the first and second devices when the signals arrive at the touch screen of the black box, in order for the user to use the user's fingers to define contour of objects intended to be captured and removed, certain defined contour of objects come from the video signals of the first device whereas other defined contour of objects come from the video signals of the second device;
        the defined contour of objects, the video signals of both the first and second devices are further sent securely to a remote server through cloud computing via network cables, bluetooth, wifi, 4G, and other wireless technologies;
        the video signals of both the first and second devices are screened in real-time to decide if any defined contour of objects are found,
        if found, the defined contour of objects are removed from each of the video signals and missing areas vacated by the removed objects are filled nicely by neighboring pixels;
        the processed video signals are subsequently sent back to the respective device by the black box through the output element through interfaces, including high-definition multimedia interface, for purposes of sending back the processed video signals to the device, the processed videos signals appearing on the displays of the first and second devices as if nothing has been edited or removed; and
        the user is allowed to undo the removal of one defined contour of object so that the one defined contour of object reappears but the rest of the defined contour of objects remain removed from the video signals.

4. The black box of claim 3, wherein:
    sensitivity of the defined contour of objects to be screened is configurable by the user via the remote server such that one object can be screened from the video signals when the detected object reaches a lower matching sensitivity level whereas another object stays in the video signals if the object fails to reach a defined matching sensitivity level;
    other parameters of the black box are configurable by the user via a web page by pointing to the black box, wherein the other parameters include choices of processing means, locations of the remote server or the cloud, authentication information, security certificates, and various types of processing choices of the audio and video signals, further wherein a said processing choice includes mixing the video and audio signals such that the processed video and audio signals appear to originate from only a single source;

the processed video signals being outputted to a pairing output, the pairing output being an output channel whose video and audio signals are synchronized simultaneously with a second device; and the output element being connected to both the first or second devices through a kernel-based virtual machine switch.

* * * * *